3,173,798
LIGNOCELLULOSE METHOD AND PRODUCT
William T. Glab, Dubuque, Iowa, assignor to Caradco Incorporated, a corporation of Iowa
No Drawing. Original application Oct. 22, 1958, Ser. No. 768,832, now Patent No. 3,033,695, dated May 8, 1962. Divided and this application May 4, 1962, Ser. No. 192,363
2 Claims. (Cl. 106—163)

This invention relates to methods of making a lignocellulose product and to the products resulting therefrom.

This application is a division of my co-pending application Serial No. 768,832, filed October 22, 1958, now patent No. 3,033,695, which was a continuation-in-part of application Serial No. 764,232, filed September 30, 1958, now Patent No. 2,984,578.

It is an object of this invention to provide an improved method of making a moldable composition comprising reacting an essentially dry mixture including comminuted lignocellulose and a reactant of the class consisting of inorganic sulfates, inorganic sulfites, inorganic bisulfites and inorganic sulfides, organic alcohols and polyols, organic aldehydes and ketones, nitrogen compounds and organic unsaturated compounds.

Another object of this invention is to provide such a method wherein the amount of reactant is about 0.1–30.0% by weight of the lignocellulose and the reaction is conducted in an atmosphere of moisture vapor such as steam at about 275–475° F. at a pressure of about 50–550 pounds per square inch gauge, and for about 4–60 minutes.

A further object of the invention is to provide lignocellulose products prepared by the above methods.

Other objects and advantages of the invention will be given herein and will be apparent from the following description of several embodiments of the invention.

An important advantage of the invention appears to be the controlling of the reaction so that the alpha cellulose is reduced in molecular size sufficiently to prevent substantial swelling of subsequently fabricated products but not to the extent that toughness of fiber is lost. This latter occurs under drastic degradation and starts to become quite serious when approximately 25% of the lignocellulose has been lost as either gaseous or soluble by-products.

Another advantage appears to be the plasticization of the lignin component during the controlled cellulose degradation so that the lignin can subsequently be made to flow and function as a binder between the comminuted lignocellulose particles.

Another advantage is the provision of a relatively dry system so that high capacity for the process of, for example, wood waste is attained. This is not possible in a wet process such as ordinarily found in a pulping process in which the reactor is charged with approximately 90% water which takes up space as well as requires the addition of large amounts of energy to bring the reaction medium to the proper temperature.

Another advantage is the contacting of lignocellulose or dry mixes of lignocellulose and other ingredients under superatmospheric pressure with a vapor or combination of vapors functioning both as a heat transfer medium and as a reactant.

In the method of this invention an essentially dry mixture including comminuted lignocellulose and a reactant is reacted as by heating while confining the lignocellulose and the reactant under superatmospheric pressure as in an autoclave. During the reaction the lignocellulose bond is apparently broken and the lignin is released to operate as a binder.

It appears that the hemi-celluloses are the primary constituents of the lignocellulose which are attacked by hydrolysis, but that under the high pressure and temperature of this invention a portion of the hydrolysates are further converted to higher molecular weight materials which can function as plasticizers for the autoclave product when it is molded. At the same time, a controlled degradation of the alpha cellulose is carried out to the extent that the desired degree of moisture stability is obtained in the molded or extruded products without an unnecessary loss of toughness. These actions are believed to occur, although they have not been absolutely proven.

The methods of this invention may be carried out batchwise in an autoclave or a sealed press or continuously in a continuous contactor.

The lignocellulose which appears dry to the touch actually contains up to about 30% water before the reaction begins.

The lignocellulose which may be used in this invention includes wood as well as other lignocellulosic vegetable materials. The lignocellulose is finely divided so that the particles are preferably not more than 20 mesh in size as measured by a standard screen although smaller sizes are preferred.

During the reaction which takes place in a confined atmosphere under superatmospheric pressure various reaction products are produced, although the exact nature of the reaction is not understood. It appears that the reaction products are either inert so that the product itself is inert, have a binding action such as is true of the lignin produced, are gaseous by-products, or are polymerized. By hydrolyzing and partially removing, or polymerizing the hemi-celluloses to lignin type materials, the ratio of lignin and other binders to the alpha cellulose is increased so that the general nature of the lignocellulose mixture is drastically changed.

The high pressure method of this invention has a number of advantages that are not possible with reactions taking place at ordinary pressures and in an unconfined state. In the preferred process, steam is introduced into the autoclave both for heating purposes and to supply moisture for the reaction. In the high pressure method of this invention heat transfer is much more rapid so that in general a shorter reaction time is required. Furthermore, energy losses during the reaction are greatly reduced. In the ordinary reacting mixture these energy losses result from the release of volatile materials such as water vapor, gaseous reaction by-products and the like. As the reaction here takes place in a confined atmosphere, no such losses occur to any material degree. Furthermore, the energy supplied by the steam or vapor is utilized to heat only the lignocellulose with its approximately normal moisture content in contrast to pulping type reactions where large quantities of water are present, requiring far greater expenditures of energy.

Another important advantage of this process is the close control that is obtained over the reaction. Thus, the temperature of the reacting mass, and hence the rate of reaction, can be easily raised or lowered by controlling the rate of flow, pressure and the temperature of the heat transfer medium which may be steam, oil vapor, or other high temperature fluids. Reactions may easily be stopped by flashing the heat transfer medium from the autoclave, since the large energy loss on expansion cools the reacting mass below the incipient reaction point. During the practice of the process the reacting mixture may be confined in a jacketed vessel with the heating medium introduced to the chambers in the quantity and temperature desired.

A very important advantage of the invention is that volatile reactants may be use as the reacting mass is in a confined space. Volatile reactants are impossible, of course, when the reacting mass is in the open. As a result of the rapid heat transfer achieved by this invention and the penetration of volatile reactants, the reaction not only proceeds to completion in a much shorter time but the final product tends to be more uniform than where the reactants are heated such as in an ordinary process that depends upon surface temperature differentials.

Tests have shown that the confining of the reacting mass in the autoclave not only causes retention of the by-products of reaction within the mass even when the by-products are gaseous but also causes polymerization of all or a portion of these by-products, even some that are gaseous. In so-called wet processes, large quantities of the by-products of reaction go into solution and are lost.

Another advantage of the invention is that the volatile by-products are easily collected and removed at low cost for later use where desired or to prevent the creation of a nuisance.

Where volatile reactants are used no mechanical mixing of the ingredients is required. This results in a considerable saving in time, labor and other factors. Thus, in these instances, it is only necessary to charge the reactor with the lignocellulose and introduce the volatile materials into the reactor under superatmospheric pressure. In addition, if desired, the reactants can be changed or modified during the course of a run. This is not possible to such a degree in a wet process where the charge generally contains less than 50% of lignocellulose, and addition of reactants would in many cases cause prohibitive amounts to go into solution.

A further advantage of utilizing the vapor process is that the volatile content of the reaction product which is primarily moisture can be controlled. By using superheated steam with a sufficient degree of superheat, products on the order of 1% or lower volatile content can be obtained. Under normal conditions, 10 to 15 degrees of superheat at 300 pounds per square inch steam pressure will produce a product of 3–5% volatile content. Thus, the expensive drying step connected with wet processes can be avoided.

Because of rapid penetration of reactants under high pressure, larger sized particles can be charged to the autoclave than would ordinarily be used, and a savings in size reduction cost made as a result of lower power requirements to reduce the treated material in comparison with raw lignocellulose.

In addition, where flat stock of preformed material is being made as in a sealed press, the products can be made much thicker and more uniform than in an ordinary press which depends upon high platen temperature for heat transfer, and in many cases requires almost prohibitive cycle time.

The reactant is thoroughly mixed with the finely divided lignocellulose and then heated at a temperature and pressure and for a time sufficient to react at least a portion and preferably a major portion of the reactant or reactants with the lignocellulose.

In the preferred process the temperature of the steam is between about 275–475° F. and the pressure is between about 50–550 pounds per square inch gauge. The amount of reactant is preferably between about 0.1–30.0% by weight of the lignocellulose.

In the practice of this invention where solid reactants are used, they are preferably finely divided, and blended with the lignocellulose such as in a mixer, prior to the reaction in the autoclave. When soluble they are preferably added in the form of solutions. When liquids are used, they may be diluted with water or other solvents so that they will be thoroughly dispersed throughout the mass of lignocellulose. Preferably an amount of solution up to about 20% of the weight of the lignocellulose is utilized. If both solids and liquids are added, the solid is preferably blended with the lignocellulose before the addition of the liquid.

In each of the following examples as set out in Table I, 500 grams of 20 mesh, hammer-milled ponderosa pine containing only its normal moisture content of approximately 6% was used. To this was added the reactant in the amount specified. In each instance the mixture was ball-milled for about ½ hour to obtain a uniform dispersion of the reactant throughout the mass. The composition was then placed in a heated autoclave and steam was admitted until the pressure and temperature were those specified. The autoclave was held under these conditions for the time specified and then the steam was rapidly flashed off. During the course of the run, the stated pressure was maintained by venting off the excess pressure caused by volatile reaction by-products. The granular reaction product which had been cooled below the incipient reaction point by the rapid vapor flash-off was removed from the autoclave, and all particles which had consolidated were thoroughly broken up.

The following Table I lists a number of representative reactions utilizing inorganic sulfates, sulfites, bisulfites and sulfides, unsaturated organic compounds, organic nitrogen compounds, organic alcohols and polyols, and aldehydes and ketones with lignocellulose.

*Table I*

| Example | Reactant | Reaction Time, Min. | Autoclave Temp., °F. | Autoclave Press., p.s.i. |
|---|---|---|---|---|
| 1 | 2% Ammonium Sulfate | 20 | 440 | 300 |
| 2 | 2% Calcium Sulfate +5% "Vinsol." | 20 | 440 | 300 |
| 3 | 1% Zinc Sulfate | 25 | 400 | 200 |
| 4 | 2% Zinc Sulfate | 20 | 440 | 300 |
| 5 | 2% Ferrous Sulfate | 20 | 400 | 200 |
| 6 | 2% Ferrous Sulfate | 20 | 440 | 300 |
| 7 | 2% Ferric Sulfate | 20 | 440 | 300 |
| 8 | 1% Ferric Sulfate +5% "Vinsol." | 20 | 440 | 300 |
| 9 | 1% Cupric Sulfate | 20 | 400 | 200 |
| 10 | 3% Cupric Sulfate | 10 | 440 | 300 |
| 11 | 1% Aluminum Sulfate | 20 | 440 | 300 |
| 12 | 25% Aluminum Sulfate | 20 | 440 | 300 |
| 13 | 1% Aluminum Sulfate +5% "Vinsol." | 20 | 400 | 300 |
| 14 | 2% Aluminum Sulfate +5% "Vinsol." | 20 | 440 | 300 |
| 15 | 1% Aluminum Sulfate +5% Lignin. | 20 | 400 | 200 |
| 16 | 1% Aluminum Sulfate +5% "Phenol Residue." | 20 | 400 | 200 |
| 17 | 2% Sodium Sulfite | 25 | 440 | 300 |
| 18 | 2% Sodium Sulfite +6% Sulfur. | 25 | 440 | 300 |
| 19 | 2% Sodium Bisulfite | 30 | 460 | 400 |
| 20 | 2% Ammonium Bisulfite | 30 | 460 | 400 |
| 21 | 2% Aluminum Bisulfite | 20 | 440 | 300 |
| 22 | 3% Sodium Sulfide | 30 | 460 | 400 |
| 23 | 3% Ammonium Sulfide | 20 | 440 | 300 |
| 24 | 5% Phosphorus Pentasulfide. | 20 | 440 | 300 |
| 25 | 10% Phthalic Anhydride | 20 | 440 | 300 |
| 26 | 5% Phthalic Anhydride +1% Ferric Chloride. | 20 | 400 | 200 |
| 27 | 10% Tall Oil | 20 | 440 | 300 |
| 28 | 5% Tall Oil | 30 | 460 | 400 |
| 29 | 5% Tall Oil +5% Calcium Chloride. | 20 | 440 | 300 |
| 30 | 5% Tall Oil +5% "Vinsol. +3% Calcium Chloride. | 20 | 440 | 300 |
| 31 | 5% Tall Oil +1% Zinc Chloride. | 15 | 440 | 300 |
| 32 | 5% Tall Oil +1% Ferric Chloride. | 20 | 400 | 200 |
| 33 | 10% Tall Oil +1% Aluminum Chloride. | 5 | 400 | 200 |
| 34 | 10% Tall Oil +1% Aluminum Chloride. | 20 | 440 | 300 |
| 35 | 10% Tall Oil +2% Aluminum Chloride. | 60 | 325 | 50 |
| 36 | 10% Tall Oil +1% Acetyl Chloride. | 10 | 375 | 150 |
| 37 | 10% Tall Oil +10% Sulfur | 20 | 440 | 300 |
| 38 | 5% Linseed Oil | 30 | 440 | 300 |
| 39 | 10% Linseed Oil | 30 | 460 | 400 |
| 40 | 5% Linseed Oil +1% Ferric Chloride. | 25 | 440 | 300 |
| 41 | 10% Linseed Oil +10% Sulfur. | 20 | 440 | 300 |
| 42 | 10% Paraffin Oil +1% Ammonium Chloride. | 20 | 440 | 300 |
| 43 | 10% Paraffin Oil +0.5% Aluminum Chloride. | 20 | 440 | 300 |

All of the percentages given herein are by weight of the lignocellulose.

Where non-drying types of oils such as paraffin oil and "B.R.V." are used, it is believed that they function to limit to some extent the hydrolytic degradation of the alpha cellulose. The reaction products made with oils appear to be less brittle than when plain lignocellulose is reacted with steam.

The organic oils which may be used as reactants herein are those oils which are unsaturated or which contain a functional group that is capable of reacting with the lignocellulose or with lignocellulose products produced under the high pressure-high temperature conditions of this invention. The natural resins and materials set out herein are intended to include naturally occurring reactants of which rosin, "Vinsol," turpentine and the like are examples. In fact, the preferred members of this group are materials produced from pine tree products. Vinsol is identified in my prior Patent No. 2,872,330.

In addition to the organic oils, reaction products can be made with lignocellulose and organic alcohols and polyols, aldehydes and ketones, organic nitrogen compounds and organic unsaturated compounds.

| Example | Reactant | Reaction Time, Min. | Autoclave | |
|---|---|---|---|---|
| | | | Temp., °F. | Press., p.s.i. |
| 44 | 25% Ethyl Alcohol+50 p.s.i. Sulfur Dioxide. | 10 | 428 | 140 |
| 45 | 10% Isopropyl Alcohol | 25 | 440 | 300 |
| 46 | 10% Isopropyl Alcohol+0.5% Aluminum Chloride. | 20 | 440 | 300 |
| 47 | 10% Isopropyl Alcohol+10% Sulfur. | 20 | 440 | 300 |
| 48 | 10% Allyl Alcohol+10% Sulfur. | 20 | 440 | 300 |
| 49 | 10% Ethylene Glycol | 30 | 460 | 400 |
| 50 | 10% Ethylene Glycol+1% Aluminum Chloride. | 20 | 400 | 200 |
| 51 | 20% Ethylene Glycol+1% Aluminum Chloride. | 20 | 400 | 200 |
| 52 | 10% Glycerine+0.5% Aluminum Chloride. | 20 | 400 | 200 |
| 53 | 10% Acetaldehyde | 30 | 440 | 300 |
| 54 | 10% Acetaldehyde | 30 | 460 | 400 |
| 55 | 10% Acetaldehyde+10% Sulfur. | 20 | 440 | 300 |
| 56 | 10% Furfural | 25 | 440 | 300 |
| 57 | 10% Furfural+10% Sulfur | 13 | 440 | 300 |
| 58 | 5% Acetone+5 p.s.i. Sulfur Dioxide. | 20 | 440 | 300 |
| 59 | 10% Mesityl Oxide+12% Sulfur+15% "Vinsol." | 25 | 440 | 300 |
| 60 | 10% Acetone | 30 | 460 | 400 |
| 61 | 10% Butyraldehyde+12% Sulfur+15% "Vinsol." | 25 | 440 | 300 |
| 62 | 10% Acetaldehyde+12% Sulfur+15% "Vinsol." | 25 | 440 | 300 |
| 63 | 5% Glutaraldehyde+12% Sulfur+15% "Vinsol." | 25 | 440 | 300 |
| 64 | 5% Aniline | 30 | 440 | 300 |
| 65 | 3% Aniline | 30 | 460 | 400 |
| 66 | 5% Aniline+10% Sulfur | 20 | 440 | 300 |
| 67 | 3% Triethanolamine | 25 | 440 | 300 |
| 68 | 3% Morpholine | 30 | 460 | 400 |
| 69 | 2% Tetraethanol Ammonium Hydroxide. | 30 | 440 | 300 |
| 70 | 2% Tetraethanol Ammonium Hydroxide. | 30 | 460 | 400 |
| 71 | 3% Formamide | 30 | 440 | 300 |
| 72 | 3% Formamide | 30 | 460 | 400 |
| 73 | 5% Dicyandiamide | 25 | 440 | 300 |
| 74 | 10% Dicyandiamide+10% Sulfur. | 20 | 440 | 300 |
| 75 | 5% Melamine | 30 | 440 | 300 |
| 76 | 5% Urea+1% Aluminum Chloride. | 10 | 400 | 200 |
| 77 | 5% Urea+5 p.s.i. Sulfur Dioxide. | 25 | 440 | 300 |
| 78 | 5% Urea+5% Formaldehyde. | 30 | 460 | 400 |
| 79 | 10% Styrene Monomer | 30 | 460 | 400 |
| 80 | 10% Styrene Monomer+3% Calcium Chloride. | 20 | 440 | 300 |
| 81 | 10% Styrene Monomer+1% Ferric Chloride. | 20 | 440 | 300 |
| 82 | 10% Styrene Monomer+0.5% Aluminum Chloride. | 15 | 440 | 300 |
| 83 | 10% Styrene Monomer+1.0% Aluminum Chloride. | 20 | 400 | 200 |
| 84 | 10% Styrene Monomer+10% Sulfur. | 20 | 440 | 300 |
| 85 | 10% Vinyl Acetate Monomer. | 30 | 460 | 400 |
| 86 | 10% Vinyl Acetate Monomer+10% Sulfur. | 20 | 440 | 300 |
| 87 | 10% Dicyclopentadiene | 30 | 460 | 400 |
| 88 | 5% Dicyclopentadiene+3% Calcium Chloride. | 20 | 440 | 300 |
| 89 | 5% Dicyclopentadiene+1% Ferric Chloride. | 15 | 440 | 300 |
| 90 | 10% Dicyclopentadiene+1% Aluminum Chloride. | 10 | 400 | 200 |
| 91 | 20% Dicyclopentadiene+10% Sulfur. | 25 | 440 | 300 |

The preferred ranges in which the various classes of reactants are used are as follows:

Table II

| Reactant: | Preferred amount, percent |
|---|---|
| Inorganic sulfates, sulfites, bisulfites and sulfides | 1–15 |
| Alcohols and polyols | 2–25 |
| Organic aldehydes and ketones | 2–20 |
| Organic nitrogen compounds | 0.5–20 |
| Unsaturated organic compounds | 2–25 |

From the example cited, it is apparent that a large number of different lignocellulose reactions can be carried out with the methods of this invention to produce materials having a wide variety of properties. Thus, it is possible to produce reaction products which when molded or pressed or otherwise formed into products such as boards will possess an optimum of certain desired physical properties such as low water absorption, high strength, relatively high plasticity, or other required properties.

The materials are thus formable at a relatively low temperature in the approximate range of 275–375° F. without the use of excessive pressures. The temperature at which the products are formed is not critical since boards can easily be made at about 400° F. or higher if desired. The ability to form products at lower temperatures is an important property since many of the synthetic thermoplastic resins formable at this temperature can thus be blended with the modified lignocellulose, if it is desired to further vary the physical properties of the product.

Formed products can be produced over a wide density range such as with a specific gravity of from approximately 0.5–1.5 depending upon the temperature and pressure used. The pressure utilized can vary from about 25–5000 p.s.i. depending upon the molding temperature and the final product density desired. In general, the lower pressures are used at the higher temperatures. Where boards or preforms are produced, the pressure is generally between about 25–800 p.s.i., and the temperature between about 300–400° F. If the materials are molded the higher pressures are used and the temperature preferably between about 275–475° F.

Where boards or preforms are made, the particle size of the composition of this invention is preferably between ¼ inch–100 mesh as measured on standard screens. The especially preferred particle size is between 20–50 mesh. The press time is only sufficient to cause the particles to coalesce and bond to each other and to reach the desired board density. The time will, of course, vary with the applied pressure, press temperature and with the material used as well as the thickness of the board. In general, the press time is between about 0.2–20 minutes. A ¼ inch thick board can ordinarily be made in 6–8 minutes at a temperature of 350° F. and under 100 p.s.i. pressure.

Where the reaction products of this invention are molded, the product is preferably removed from the reaction vessel and then ground to a powder that is preferably not over about 50 mesh in size. The finely divided moldable material is heated to a temperature just sufficient to flow and fill the mold under the pressure used. The molding time is only sufficient to cause the moldable material to fill the mold and set, and will vary depending upon the type of mold being used, the temperature, the nature of the moldable material and similar factors. In general, the molding time will vary between about 0.2–15 minutes.

Having described my invention as related to the embodiments set out herein, it is my intention that the invention be not limited by any of the details of description unless otherwise specified but rather be construed broadly within its spirit and scope as set out in the accompanying claims.

I claim:
1. The method of making a lignocellulose product capable of being pressure molded, consisting essentially of: intimately mixing finely divided lignocellulose with about 0.1–30.0% by weight of a reactant of the class consisting of ammonium sulfate, calcium sulfate, zinc sulfate, ferrous sulfate, ferric sulfate, cupric sulfate, aluminum sulfate, sodium sulfite, sodium bisulfite, ammonium bisulfite, aluminum bisufite, sodium sulfide, ammonium sulfide and phosphorous pentasulfide to provide a mixture; heating said mixture in a confined atmosphere at an internal pressure of about 50–550 pounds per square inch gauge and a temperature of about 275–475° F. for about 4–60 minutes to react said reactant and lignocellulose; and supplying steam to said confined atmosphere during the reacting.

2. A lignocellulose product prepared by the method of claim 1.

References Cited in the file of this patent
UNITED STATES PATENTS

| | | |
|---|---|---|
| 2,706,160 | Glab | Apr. 12, 1955 |
| 2,864,715 | Glab | Dec. 16, 1958 |
| 2,872,330 | Glab | Feb. 3, 1959 |